United States Patent
Zupan et al.

(10) Patent No.: US 9,959,747 B1
(45) Date of Patent: May 1, 2018

(54) NETWORK FOR DETECTION AND MONITORING OF EMERGENCY SITUATIONS

(71) Applicant: The United States of America, as represented by the Secretary of the Air Force, Washington, DC (US)

(72) Inventors: Garrett C. Zupan, Hermosa Beach, CA (US); Lanetta D. Lewis, Tooele, UT (US); Rachel S. Mamroth, Layton, UT (US); Chaekyung Yoo, Salt Lake City, UT (US); Weston Lay, Layton, UT (US); Christopher L. Benson, Hill AFB, UT (US); Justin Moore, Smithfield, UT (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days. days.

(21) Appl. No.: 15/585,192

(22) Filed: May 3, 2017

Related U.S. Application Data

(60) Provisional application No. 62/341,678, filed on May 26, 2016.

(51) Int. Cl.
| | |
|---|---|
| *H04M 11/04* | (2006.01) |
| *G08B 25/10* | (2006.01) |
| *G05B 13/00* | (2006.01) |
| *H04M 1/82* | (2006.01) |
| *G08B 25/14* | (2006.01) |
| *G08B 7/06* | (2006.01) |
| *G08B 21/02* | (2006.01) |
| *G08B 5/22* | (2006.01) |

(52) U.S. Cl.
CPC ............. *G08B 25/10* (2013.01); *G05B 13/00* (2013.01); *G08B 5/22* (2013.01); *G08B 7/06* (2013.01); *G08B 21/02* (2013.01); *G08B 25/14* (2013.01); *H04M 1/82* (2013.01)

(58) Field of Classification Search
USPC ..... 455/404.2; 340/540, 18.1, 691.6; 379/37
See application file for complete search history.

(56) References Cited

U.S. PATENT DOCUMENTS

| | | | |
|---|---|---|---|
| 7,277,018 B2 | 10/2007 | Reyes et al. | |
| 7,460,020 B2 | 12/2008 | Reyes et al. | |

(Continued)

*Primary Examiner* — David Q Nguyen
(74) *Attorney, Agent, or Firm* — AFMCLO/JAZ; Timothy Barlow

(57) ABSTRACT

A method and system for assessing a threat level associated with a distress signal. The method may include linking a first communication device on a client side communication system with a second communication device on a provider side communication system over a communications network. The method may include transmitting a distress signal from the first communication device to the second communication device, and mapping, via the provider side communication system, a geographic origin of the distress signal. The method may also include transmitting an audio signal in a one-way communication link from the first communication device to the second communication device, and attributing a threat level associated with any of an audio level, a frequency, and a duration of the transmitted audio signal via the provider side communication system.

12 Claims, 18 Drawing Sheets

(56) References Cited

U.S. PATENT DOCUMENTS

| | | | |
|---|---|---|---|
| 7,961,550 B2 | 6/2011 | Calhoun | |
| 8,312,660 B1 * | 11/2012 | Fujisaki | F41A 17/08 |
| | | | 42/70.01 |
| 9,717,101 B1 * | 7/2017 | Burnham | H04W 76/007 |
| 9,794,755 B1 * | 10/2017 | South | H04W 4/04 |
| 2003/0053602 A1 * | 3/2003 | Stuckman | H04L 12/66 |
| | | | 379/37 |
| 2008/0048851 A1 | 2/2008 | Reyes et al. | |
| 2011/0111728 A1 * | 5/2011 | Ferguson | H04M 1/72541 |
| | | | 455/404.2 |
| 2011/0170798 A1 | 7/2011 | Tidhar | |
| 2012/0300587 A1 | 11/2012 | Azmi-Sadjadi et al. | |
| 2012/0329420 A1 * | 12/2012 | Zotti | H04M 1/72541 |
| | | | 455/404.2 |
| 2014/0097939 A1 * | 4/2014 | Pham | H04W 4/02 |
| | | | 340/8.1 |
| 2014/0118144 A1 * | 5/2014 | Amis | G08B 21/02 |
| | | | 340/540 |
| 2015/0204109 A1 | 7/2015 | Ergenbright | |
| 2016/0180663 A1 * | 6/2016 | McMahan | G08B 25/08 |
| | | | 340/691.6 |
| 2017/0118597 A1 * | 4/2017 | Swirsky | H04W 4/027 |
| 2017/0171640 A1 * | 6/2017 | Shintani | H04N 21/814 |

\* cited by examiner

NETWORK FOR DETECTION AND MONITORING OF EMERGENCY SITUATIONS

CROSS-REFERENCE TO RELATED APPLICATION(S)

This application claims the benefit of U.S. Provisional Patent Application No. 62/341,678 filed on May 26, 2016, the contents of which, in its entirety, is herein incorporated by reference.

GOVERNMENT INTEREST

The invention described herein may be manufactured and used by or for the Government of the United States for all government purposes without the payment of any royalty.

FIELD OF THE INVENTION

The embodiments herein generally relate to an active shooter protection system and method of using the same, and more particularly to a networked system to send alerts and live audio to an emergency response controller to provide situational awareness of an evolving threat, which can thereby be enabled to send any of alerts, live audio, and pre-recorded audio to the scene of an active shooter.

BACKGROUND OF THE INVENTION

An active shooter generally refers to an individual actively engaged in violence through the use of firearms (or other types of weapons) that could create bodily harm and possibly kill people in a public or private area. Recently, active shooter incidents in occupied facilities such as campuses, military bases, commercial establishments, etc., have involved single shooters, have ended in under 5 minutes, were indoors, and were often confined to one building. Responding to these threats has been challenging because they have ended before police arrive more frequently than ending after police arrive. However, such incidents could endure for a longer period while also being outdoors or spread across multiple buildings. Regardless, conventional control measures for active shooter incidents may be considered insufficient to reduce and prevent active shooter incidents, limit the harm or threat of harm to persons exposed, or improve law enforcement response time to such incidents. First responders, typically dispatched via standard 911 or emergency notifications, may not be able to respond to an active shooter incident quickly enough to prevent injuries or deaths.

The above information disclosed in this Background section is only for enhancement of understanding of the background of the disclosure and therefore it may contain information that does not form any part of the prior art nor what the prior art may suggest to a person of ordinary skill in the art.

BRIEF SUMMARY OF THE INVENTION

In view of the foregoing, an embodiment herein provides a method of assessing a threat level associated with a distress signal. The method includes linking a client side communication system with a provider side communication system over a communications network. The client side communication system includes a first communication device, and the provider side communication system comprises a second communication device. The method includes linking the first communication device with the second communication device over the communications network, transmitting a distress signal from the first communication device to the second communication device, and mapping, via the provider side communication system, a geographic origin of the distress signal. The method also includes transmitting an audio signal in a one-way communication link from the first communication device to the second communication device, and attributing a threat level associated with any of an audio level, a frequency, and a duration of the transmitted audio signal via the provider side communication system.

In some of the embodiments of the method, attributing the threat level may include graphically representing a seriousness of a threat. In some of the embodiments, the method may further include utilizing, via the second communication device, the audio signals collected from the first communication device to identify a location of a threatening object in relation to the geographic origin of the distress signal. In some of the embodiments, the method may further include the provider side communication system communicating with an emergency responder system and transmitting the geographic origin of the distress signal.

In some of the embodiments of the method, the client side communication system may further include a plurality of first communication devices, the provider side communication system may transmit a warning message to the plurality of first communication devices, and the plurality of first communication devices may include speakers and play an audio of the warning message over the speakers.

In some embodiments of the method the client side communication system may further include a plurality of first communication devices, the provider side communication system may transmit an all clear message to the plurality of first communication devices, and the plurality of first communication devices may include speakers and play an audio of the all clear message over the speakers.

Another embodiment provides a non-transitory program storage device readable by computer, and comprising a program of instructions executable by the computer to perform a method of assessing a threat level associated with a distress signal. The method includes linking a client side communication system with a provider side communication system over a communications network. The client side communication system includes a first communication device, and the provider side communication system includes a second communication device. The method includes linking the first communication device with the second communication device over the communications network, transmitting a distress signal from the first communication device to the second communication device, and mapping, via the provider side communication system, a geographic origin of the distress signal. The method also includes transmitting an audio signal in a one-way communication link from the first communication device to the second communication device, and attributing a threat level associated with any of an audio level, a frequency, and a duration of the transmitted audio signal via the provider side communication system.

In some of the embodiments of the non-transitory program storage device readable by computer, comprising the program of instructions executable by the computer to perform the method, the attributing of the threat level may include graphically representing a seriousness of a threat. In some embodiments of the program storage device, the method may further include utilizing, via the second communication device, the audio signal collected from the first communication device to identify a location of a threatening object in relation to the geographic origin of the distress signal. In some embodiments of the program storage device, the method may further include configuring the provider side communication system to communicate with an emergency responder system and transmitting the geographic origin of the distress signal to the emergency responder system.

In some embodiments of the program storage device, the client side communication system may further include a plurality of first communication devices, and the method may further include transmitting, via the provider side communication system, a warning message to the plurality of first communication devices, and the plurality of first communication devices may include speakers, and the method may further include playing an audio of the warning message over the speakers.

In some embodiments of the program storage device, the method may further include assessing, via the provider side communication system, a severity level of the distress signal.

Another embodiment provides a system for assessing a threat level associated with a distress signal. The system includes a client side communication system communicatively linked with a provider side communication system over a communications network. The client side communication system includes a first communication device, the provider side communication system includes a second communication device, and the first communication device is communicatively linked with the second communication device over the communications network. The system includes a transceiver operatively connected to the first communication device and configured to transmit a distress signal from the first communication device to the second communication device. The system includes a processor operatively connected to the provider side communication system, and configured to conduct a threat assessment associated with the distress signal. The system also includes a mapping module operatively connected to the provider side communication system, and configured to map a geographic origin of the distress signal, and a microphone operatively connected to the first communication device, and configured to transmit an audio signal in a one-way communication link from the first communication device to the second communication device. In the system, the processor is configured to attribute a threat level associated with any of an audio level, a frequency, and duration of the transmitted audio signal.

In some embodiments, the system may further include a display device operatively connected to the processor and configured to graphically represent a seriousness of a threat based on the threat assessment. In some embodiments of the system, the second communication device may be configured to utilize the audio signal received from the first communication device to identify a location of a threatening object. In some embodiments of the system, the provider side communication system may be configured to communicate with an emergency responder system and transmit the geographic origin of the distress signal to the emergency responder system. In some embodiments of the system, the client side communication system may further include a plurality of first communication devices, the provider side communication system may be configured to transmit a warning message to the plurality of first communication devices, and the plurality of first communication devices may include speakers and may be configured to play an audio of the warning message over the speakers.

In some embodiments of the system, the processor may be configured to assess a severity level of the distress signal. In some embodiments of the system, the first communication devices may include a telephone. In some embodiments, the system may further include a button on the first communication device operatively connected to the transceiver, wherein the button may be configured to generate and send the distress signal to the transceiver for transmission to the second communication device.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF THE INVENTION

Figure 1:
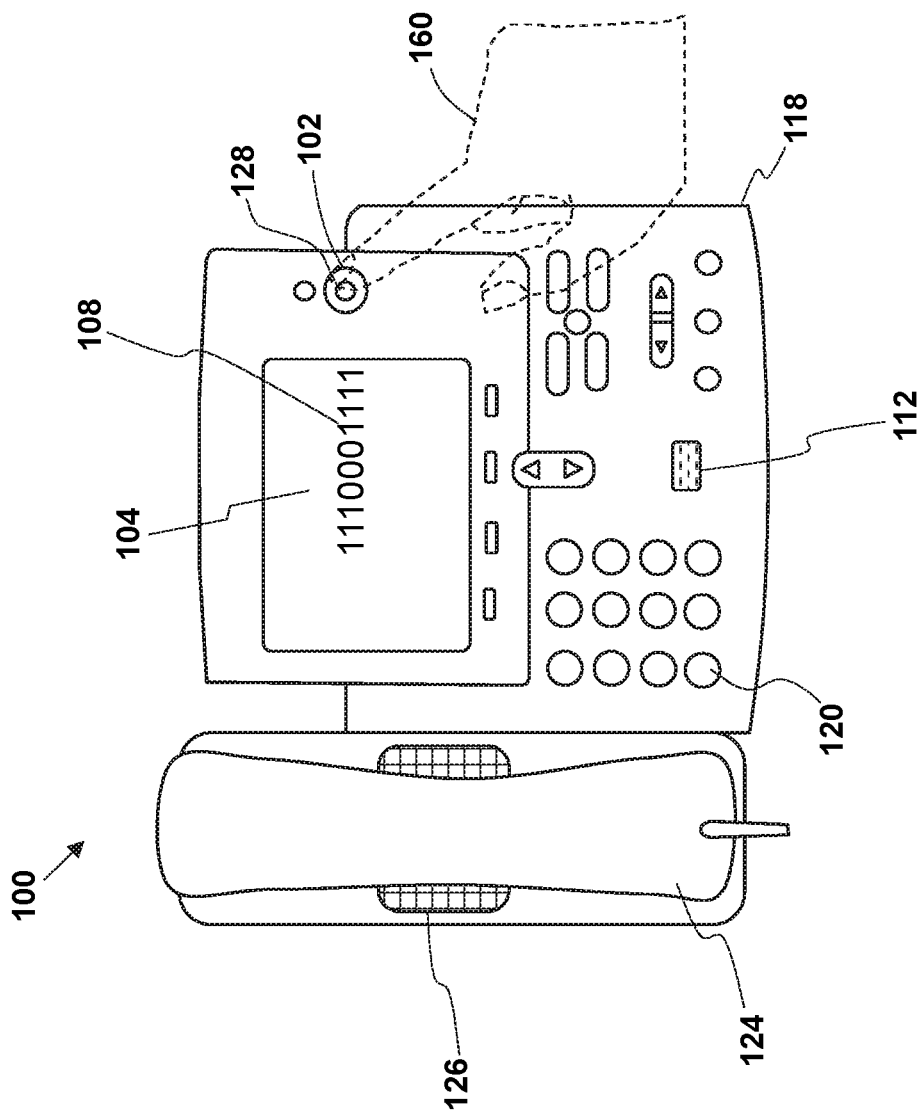
FIG. 1 is a schematic of a communication device for assessing a threat level according to an embodiment herein.

Embodiments of the disclosed invention, its various features and the advantageous details thereof, are explained more fully with reference to the non-limiting embodiments that are illustrated in the accompanying drawings and detailed in the following description. Descriptions of well-known components and processing techniques are omitted to not unnecessarily obscure what is being disclosed. Examples may be provided and when so provided are intended merely to facilitate an understanding of the ways in which the invention may be practiced and to further enable those of skill in the art to practice its various embodiments. Accordingly, examples should not be construed as limiting the scope of what is disclosed and otherwise claimed.

It will be understood that when an element or layer is referred to as being "on", "connected to", or "coupled to" another element or layer, it may be directly on, directly connected to, or directly coupled to the other element or layer, or intervening elements or layers may be present. In contrast, when an element or layer is referred to as being "directly on", "directly connected to", or "directly coupled to" another element or layer, there are no intervening elements or layers present. It will be understood that for the purposes of this disclosure, "at least one of X, Y, and Z" may be construed as X only, Y only, Z only, or any combination of two or more items X, Y, and Z (e.g., XYZ, XYY, YZ, ZZ).

In the drawings, the size and relative sizes of layers and regions may be exaggerated for clarity. Referring now to the drawings, and more particularly to FIGS. 1 through 18, where similar reference characters denote corresponding features consistently throughout, there are shown exemplary embodiments of systems and methods for providing a rapid alert of an Active Shooter to a first responder, monitoring in real-time actions of an Active Shooter, notifying in real-time a population in danger of becoming victims of an Active Shooter to take action to remove itself from harm's way, and providing real-time updates to first responders of the actions of the Active Shooter. In some embodiments, an IP networked communication is used.

FIG. 1 is a schematic of a first communication device 100 for assessing a threat level according to an embodiment herein. As illustrated in FIG. 1, the first communication device 100 may include a distress button 102 for placing an emergency distress call, a screen 104 to display text messages 108, and a microphone 112 to pick up sounds in the area of the first communication device 100. The first communication device 100 may be a voice over internet protocol (VoIP) phone and may include a transceiver 118, a dial pad 120, a handset 124, and a speaker 126. The distress button 102 may have a flexible ring 128 to prevent inadvertent pressing by a user 160, and the distress button 102 may be a dedicated button on the device 100. For example, the flexible ring 128 may be a contrasting color, e.g. red, and may require additional pressing force than other buttons on the first communication device 100 to prevent false alarms, etc.

Figure 2:
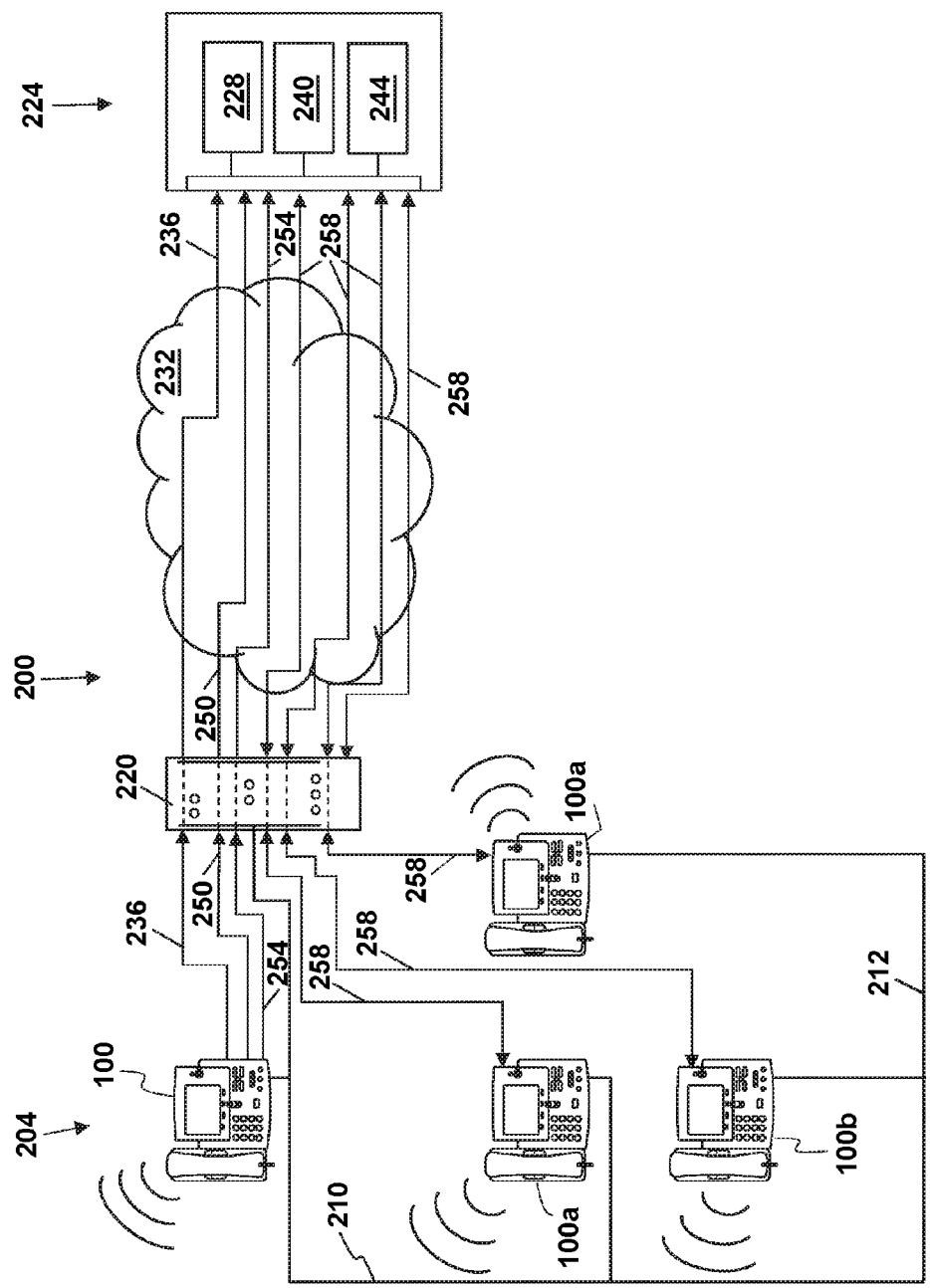
FIG. 2 is a schematic of a system for assessing a threat level according to an embodiment herein.
Figure 3:
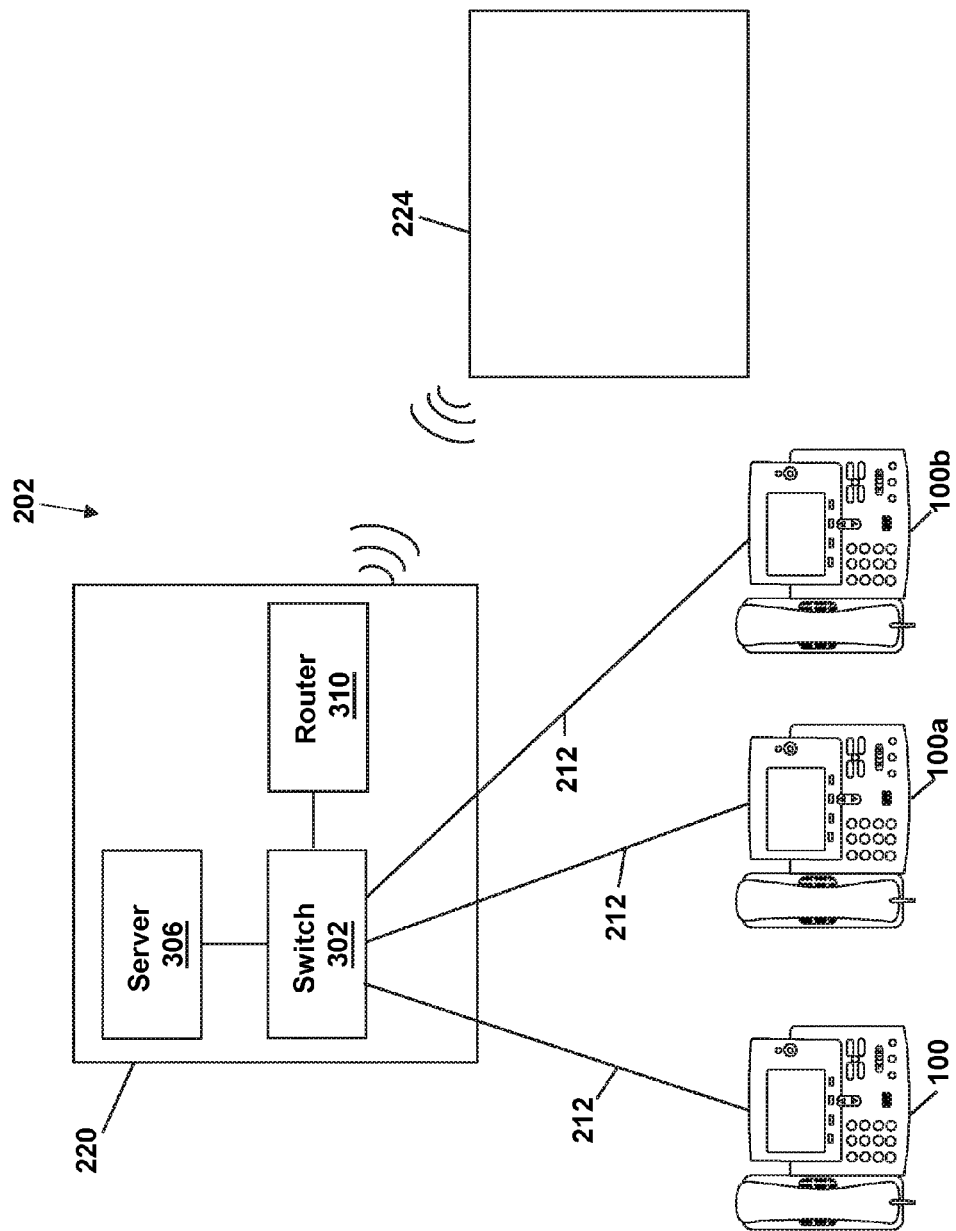
FIG. 3 is a schematic diagram of a portion of the hardware layout for the system for assessing a threat level according to an embodiment herein.

With reference to FIG. 1, FIG. 2 is a schematic of a system 200 including the first communication device 100 for assessing a threat level, and FIG. 3 is a schematic diagram of a portion of the hardware layout 202 of system 200 according to an embodiment herein. The system 200 can include at least one first communication device 100, and preferably the system 200 includes a plurality of first communication devices 100, 100a, and 100b, which may be configured as a plurality of voice over internet protocol (VoIP) phones connected by a network 210 on a client side 204 of the system 200. The plurality of first communication devices 100, 100a, and 100b may be linked by connectors 212, e.g. wireless or wired, to a client side control system 220. The client side control system 220 may include a client side switch 302 (see FIG. 3) operatively connected to the plurality of communication devices 100, 100a, and 100b over the connectors 212, a client side server 306, and a client side router 310. The client side router 310 may be configured to communicate with a provider side communication system 224 and a second communication device 228 (see FIG. 2), such as a centralized communications computer (CCC) over a communication network 232, such as through the internet, over a telephone line, or a radio link, e.g. a cellular connection.

As described in more detail below, the first communication device 100 on the client side 204 can communicatively link with the second communication device 228 in the provider side communication system 224 over the communications network 232. The transceiver 118 (see FIG. 1) may be operatively connected to the first communication device 100 of system 200 and may transmit a distress signal 236 from the first communication device 100 to the second communication device 228. The provider side communication system 224 can include a provider processor 240 operatively connected to the provider side communication system 224 and configured to conduct a threat assessment associated with the distress signal 236. The processor 240 may be configured as a standalone computer, portable device, a processor within a computer, or a controller, among other types of processing devices.

Upon initiation of the distress signal 236 by the user 160 pressing distress button 102 on the first communication device 100, the system 200 establishes a one-way communication link 250 so that the provider side 224 receives audio from the client side 204, but does not transmit audio back to the client side 204 to avoid endangering occupants in the vicinity of the first communication device 100. In other words, if occupants located near the first communication device 100 are attempting to hide from a shooter, then any audio received and output by the first communication device 100 would alert the shooter that someone may be near the first communication device 100. Instead, a text message 108 may be displayed on the screen 104 of the first communication device 100. The text message 108 may confirm that the distress signal 236 was received and indicate that one-way audio transmission with the provider side 224 has been established. Further, the text message 108 may provide instructions to cancel the call in the event of inadvertent activation by the user 160. For example, the text message 108 could display "if this is an inadvertent activation, call 911 to cancel your distress signal." A text message 108 may be sent to other first communication devices 100a and 100b, such as other communication devices on the network 210 in the area of the first communication device 100 that initiated the distress signal 236. Such an area could include, for example, the same campus, building, or floor so that when warning messages of the active shooter incident are displayed, nearby occupants or persons will be immediately alerted to the danger. In some embodiments, the other first communication devices 100a and 100b may transmit audio transmission signals 258 to the provider side 224 through microphones 112, which may be used to track the active shooter. In other embodiments, the speakers 126 on the first communication devices 100, 100a, and 100b may be configured to broadcast a warning message, such as "lockdown" or some other code word or signal indicative of an active shooter in the vicinity. The microphone 112 operatively connected to the first communication device 100 may also transmit audio signals 254 in a one-way communication link 250 from the first communication device 100 to the second communication device 228.

The system 200 may further include a mapping module 244 operatively connected to the provider side communication system 224 to graphically represent the seriousness of the threat/incident.

Figure 4:
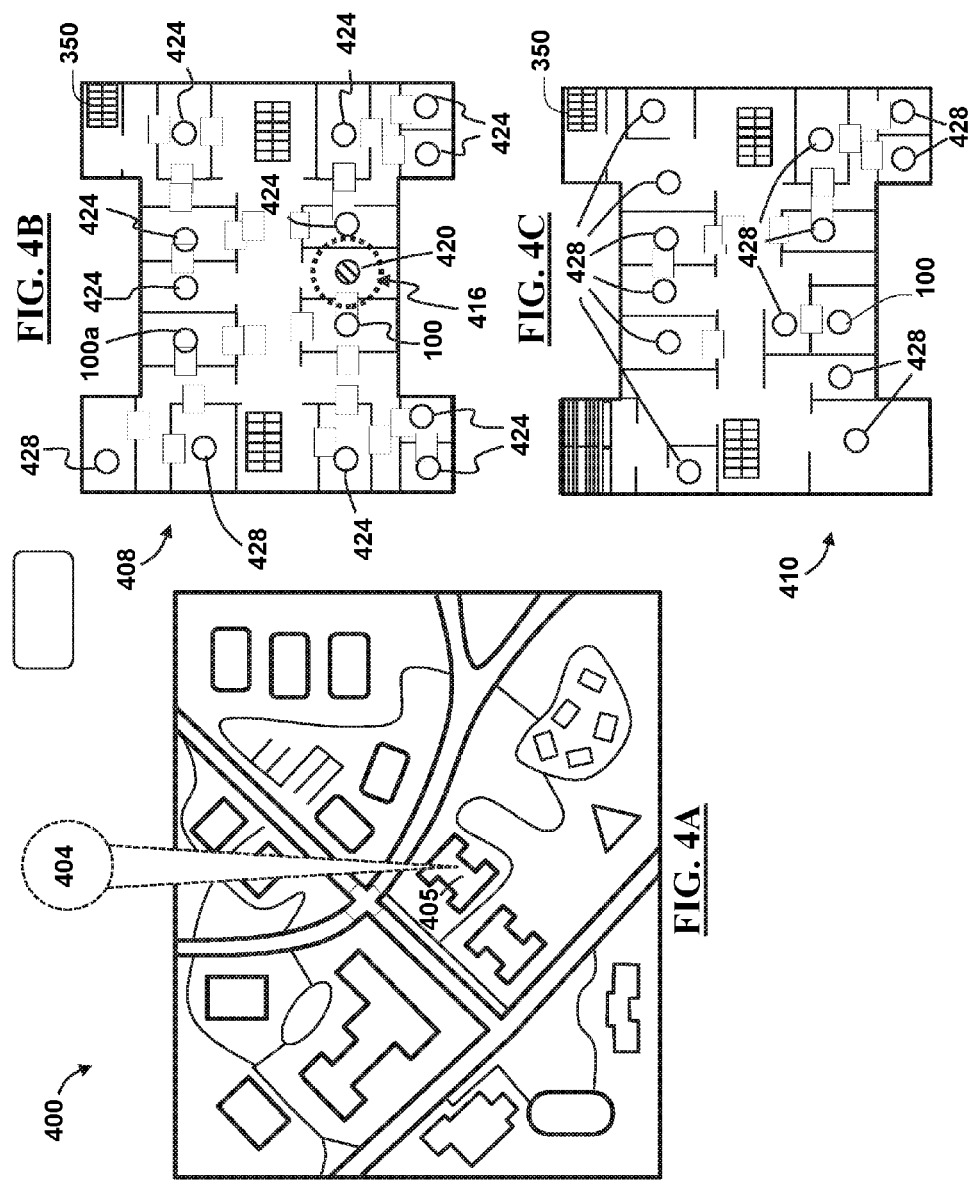
FIGS. 4A, 4B, and 4C are schematic diagrams illustrating a map according to an embodiment herein.

Referring to FIG. 4, with reference to FIGS. 1 through 3, the mapping module 244 may include a digital map 400, which may be displayed on a display device 1223 (of FIG. 18), which may be configured as a computer monitor, television screen, smartphone, tablet computer, etc., a location 404 of a geographic origination of the distress signal 236. The location 404 may be a building 405, a floor 408 or a plurality of floors 408, 410 in the building 405, and an area 416 on the floor 408. For example, the area 416 may be an office, a hallway, a group of offices, etc. In the system 200, the provider processor 240 may attribute a threat level at the location 404 in real-time associated with an audio level, a frequency, and/or duration of the transmitted audio signals 254. For example, the audio signal 254 may be identified by a digital signal processing calibration technique using a noise level such as a root mean square (RMS) level associated with volume of the noise. Here, the processor 240 may use the frequency and/or duration of the audio signal 254 to identify peaks and compare this with known frequencies generated by other types of noises to determine whether the frequencies match. The processor 240 then uses the RMS level of the noise to provide a first responder with a visual map of where 'action' within the building 405 or complex may be occurring (i.e., a grouping of red dots, for example, may indicate high activity/action within the building 405) and where within the building 405 or complex 'non action' may be occurring (i.e., a grouping of grey dots, for example, may indicate limited or no activity within the building 405). This may allow the first responder to understand which building 405 or location within a building 405 may be more likely to be under attack. For example, a gunshot may be recognizable by any of an audio level, frequency, and duration of the transmitted audio signals 254. For example, a gunshot may be distinguishable from a file cabinet drawer or door slam.

In particular, but not required in all aspects, the attributing of the threat level may include graphically representing a seriousness of a particular threat. For example, the graphical representation may include a color coding on the map 400. In this regard, the first communication device 100 that transmitted the distress signal 236 may appear as red on the map 400 when the distress signal 236 is initiated, or the first communication device 100 may appear as another color or shape and change to red when the transmitted audio signals 254 correspond to any of a gunshot or other loud noises that indicate imminent violence, such as screaming, shouting, or other loud voices indicative of an active threat.

Describing the display map 400 in more detail, the first communication devices 100, 100a, and 100b may be distributed on the floors 408, 410 of the building 404. For example, in embodiments where first communication devices 100, 100a, and 100b are VoIP phones, the phones may be at desks and workstations, etc. distributed throughout the building 404. The first communication device 100 that sent the distress signal 236 may be indicated as a first color (e.g., blue), and, when the other first communication devices 100a and 100b transmit audio transmission signals 258 to the provider side 224 through microphones 112, which may be used to track the active shooter, a nearby VoIP phone 420 may transmit a loud sound to the second communication device 228. The nearby VoIP phone 420 may be displayed as a second color (e.g., red) indicating a heightened threat in the area 416 of the nearby VoIP phone 420. That is, the first communication device 100 that sent the distress signal 236 may be considered the location of the active shooter until additional information is transmitted.

Next-nearest communication devices 424 (which may be similarly configured like first communication device 100 and other first communication devices 100a and 100b) may go quiet and transmit very low or no audio as nearby occupants may have become aware of the threat. The next-nearest communication devices 424 may be displayed as a third color on the map 400 (e.g., grey), whereas further away communication devices 428 (which may be similarly configured like first communication device 100 and other first communication devices 100a and 100b) may transmit normal level sounds of the non-threatened environment (such as office conversation) as occupants near those further away communication devices 428 may not be aware of the threat. The further away communication devices 428 may be displayed in a fourth color on the map 400 (e.g., green). A stairway 350 may be a safer exit route away from the second color nearby VoIP phone 420 and may be designated as such in the map 400 by a color code (e.g., green). As additional communication devices 100a and 100b send distress signals 236, those additional communication devices 100a and 100b may change to the first color, for example, blue. However, when the communication devices 100, 100a that send distress signal 236 transmit a loud sound, such as a gunshot report, they may be displayed as the second color, e.g. red. In some instances, a distress signal 236 may even be sent prior to a shot being fired, if a user 160 initiates the button 102.

Figure 5:
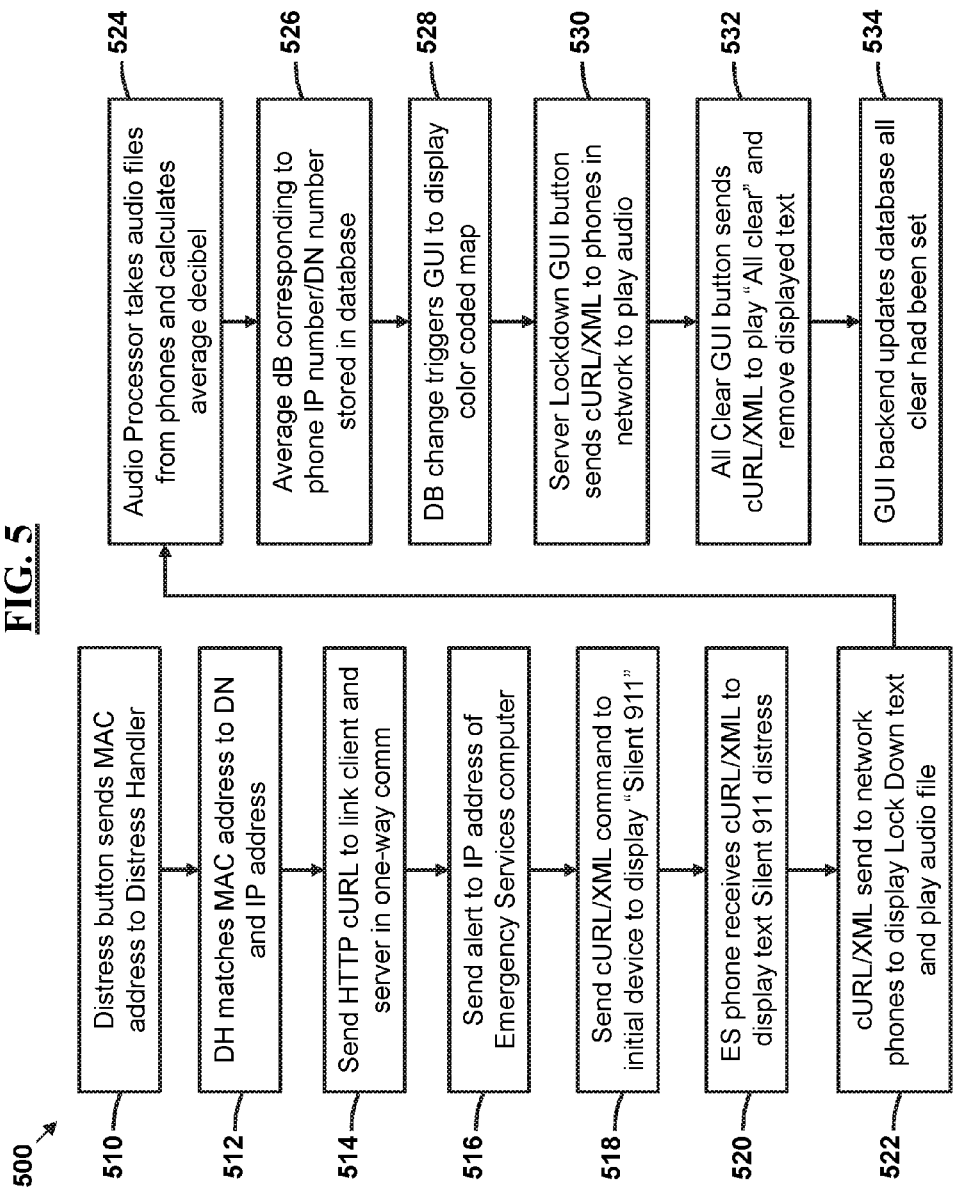
FIG. 5 is a flow diagram showing a method for assessing a threat level according to an embodiment herein.
Figure 6:
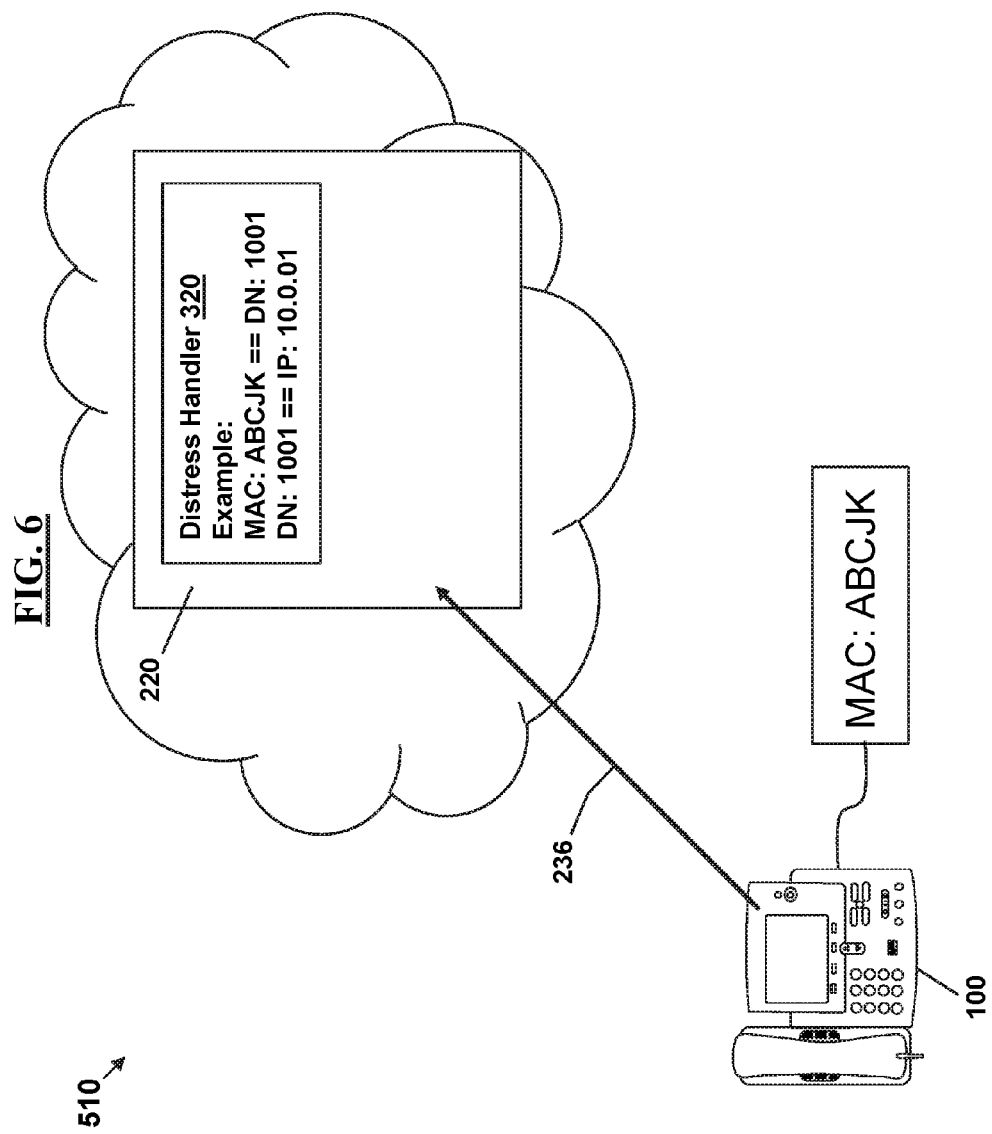
FIG. 6 is a schematic diagram illustrating a step of pushing a distress button that corresponds to sending a client side communication device media access control (MAC) address to a Distress Handler (DH) software running within a processor according to an embodiment herein. The Distress Handler matches up the MAC address to the Direct Number (DN) and Internet Protocol (IP) address assigned to the communication device according to an embodiment herein.

FIG. 5, with reference to FIGS. 1 through 4 and 6 through 17, is a flow diagram showing a method 500 for assessing a threat level according to an embodiment herein. In step 510, as shown schematically in FIG. 6, pressing the distress button 102 may correspond to sending a MAC address of the first communication device 100 to a Distress Handler (DH) software 320 running within the client side control system 220. For example, when a user 160 presses the button 102, and the Distress Handler 320 may match the MAC address to the Direct Number (DN) and IP address assigned to the first communication device 100 in step 512.

Figure 7:
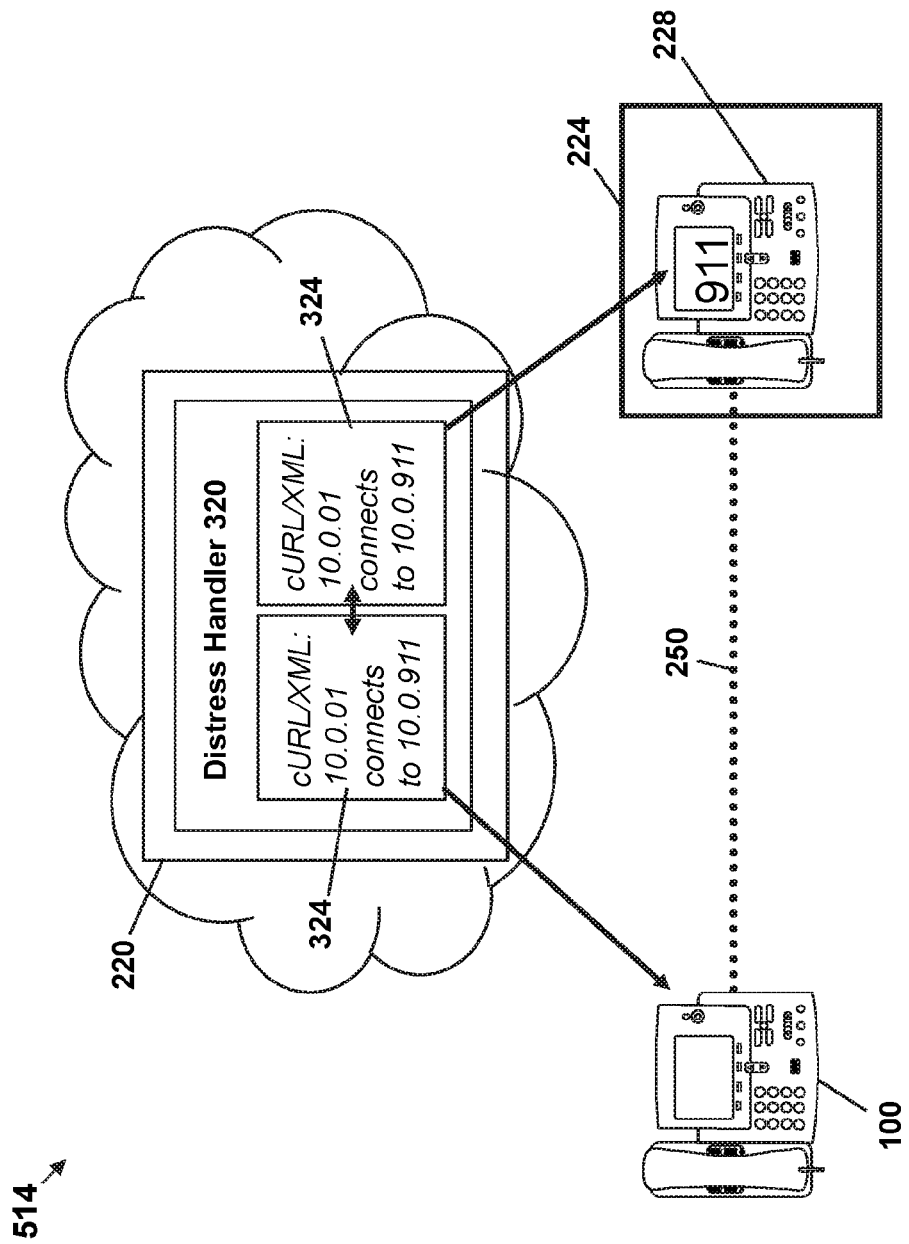
FIG. 7 is a schematic diagram illustrating a step of the Distress Handler sending a Hypertext Transfer Protocol (HTTP) client Uniform Resource Locator library (cURL) request to the communication device that sent the distress signal and to the designated Emergency Services (ES) phone with eXtensible Markup Language (XML) commands that state the two numbers are connecting in a one-way communication according to an embodiment herein.
Figure 8:
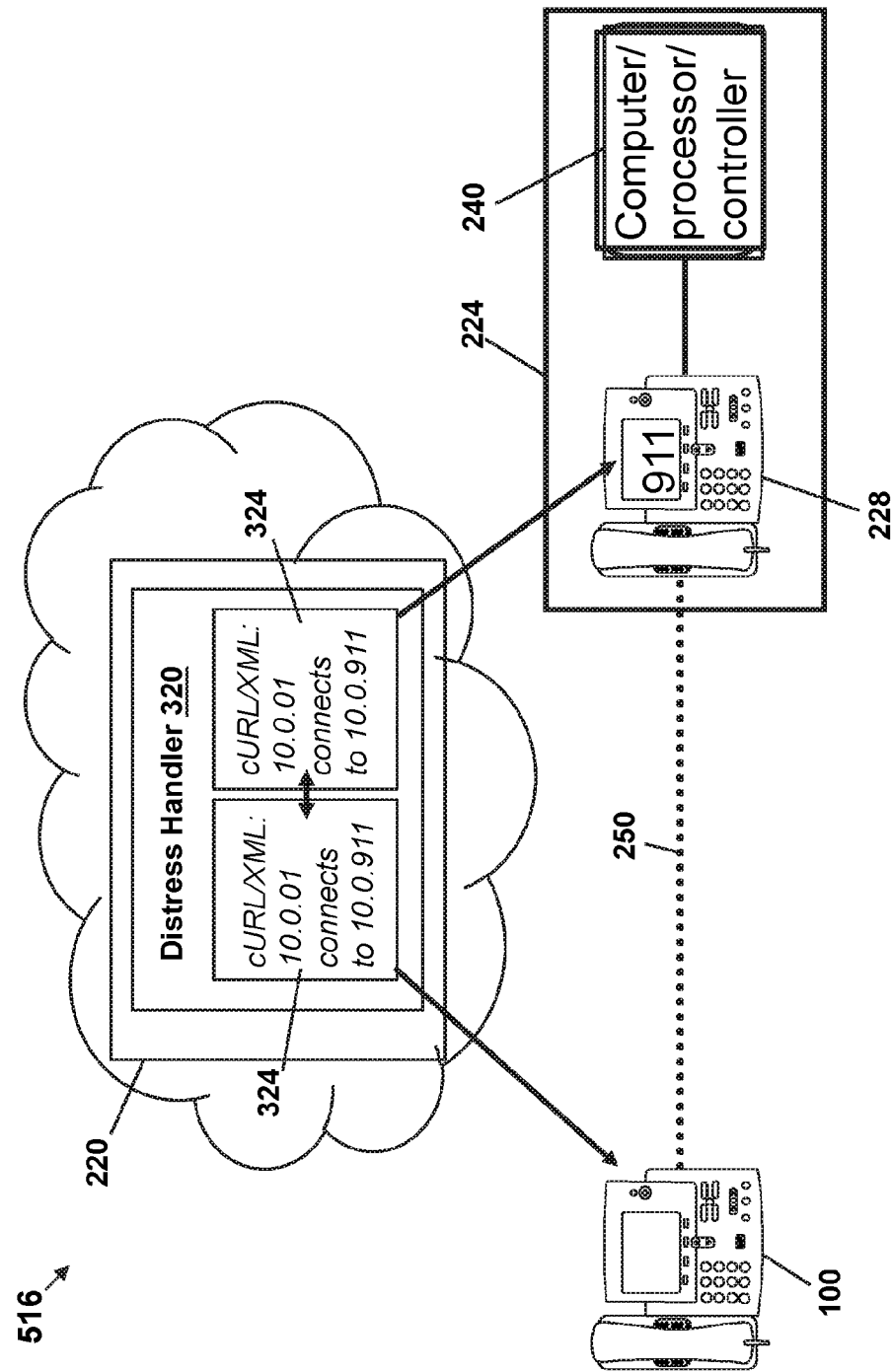
FIG. 8 is a schematic diagram illustrating a step where the Distress Handler sends an alert to an IP address associated with the Emergency Services computer according to an embodiment herein.

As shown schematically in FIG. 7, at step 514, the Distress Handler 320 may send a Hypertext Transfer Protocol (HTTP) Client Uniform Resource Locator library (cURL) request 324 to the first communication device 100 that sent the distress signal 236 and may send to a second communication device 228, which may be a designated Emergency Services (ES) VoIP phone, eXtensible Markup Language (XML) commands that state the two numbers or the two communications devices 100, 228 are connecting in a one-way communication link 250 (such as a phone call, etc.) according to the embodiment. In step 516, as illustrated schematically in FIG. 8 the Distress Handler 320 may send an alert to an IP address associated with the Emergency Services computer (i.e., provider processor 240).

Figure 9:
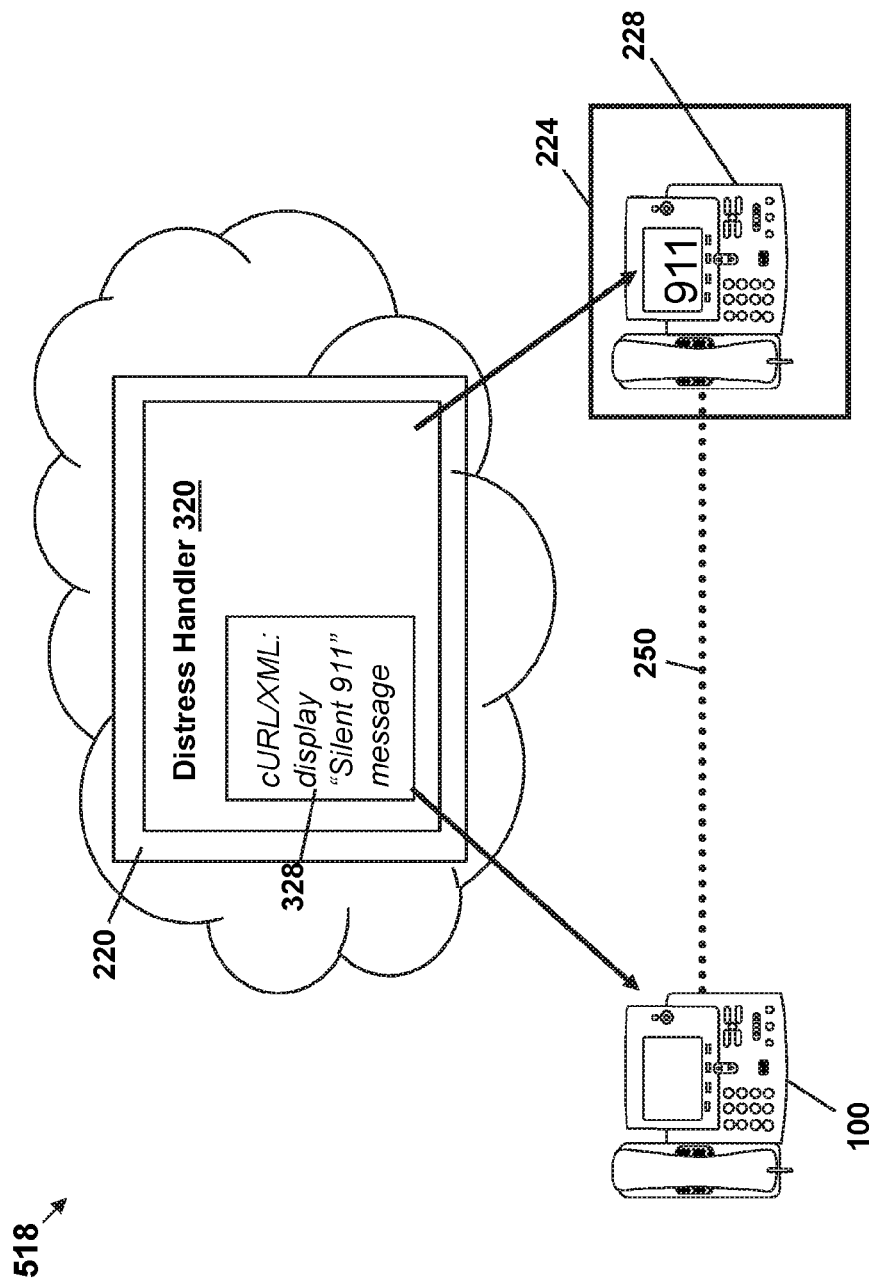
FIG. 9 is a schematic diagram illustrating a step where the Distress Handler sends a cURL/XML command to a client side communication device to display a "Silent 911" message, indicating that the communication device is in a one-way connection according to an embodiment herein.

In FIG. 9, step 518 illustrates that the Distress Handler 320 may send a cURL/XML command 328 to the first communication device 100 (such as an initiating VoIP phone) to display the text message 108 (such as a "Silent 911" message) indicating that the first communication device 100 is in a one-way communication link 250. In a one-way communication link, the initial VoIP phone (i.e., first communication device 100) may be heard by the second communication device 228, but the second communication device 228 cannot be heard by the initial VoIP phone (i.e., first communication device 100).

Figure 10:
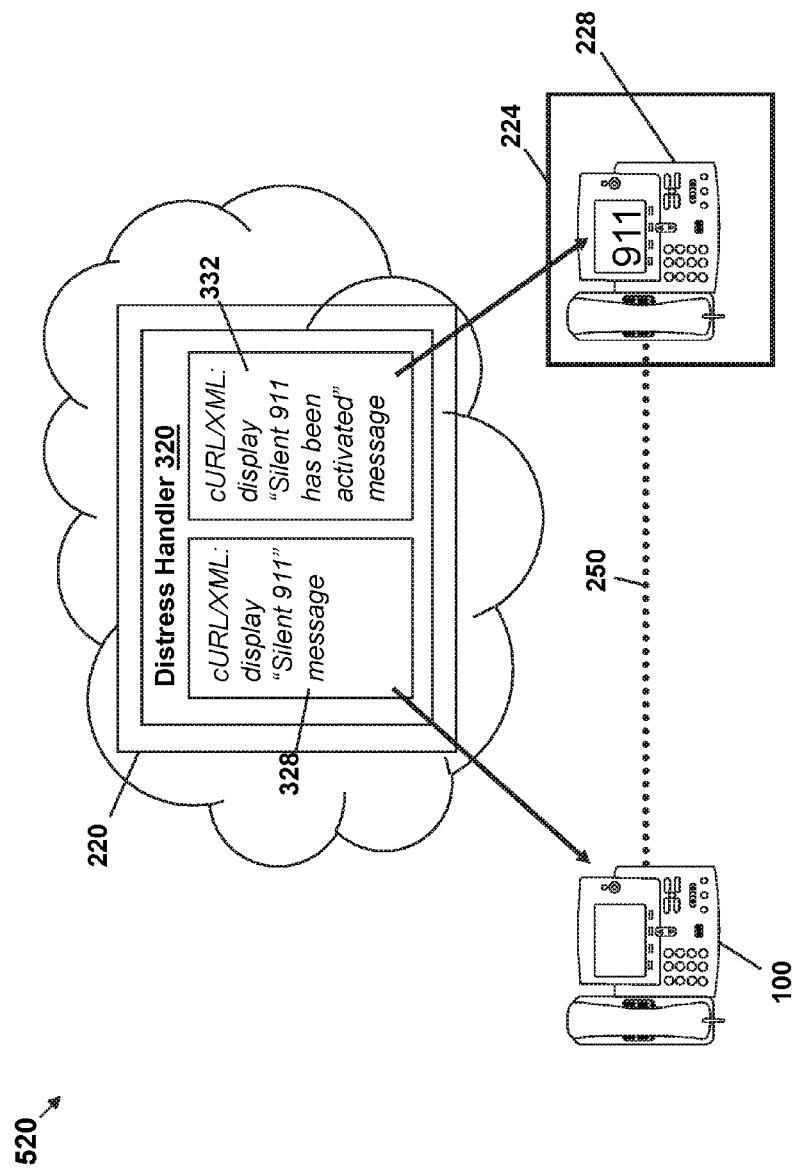
FIG. 10 is a schematic diagram illustrating a step where the Emergency Services communication device also receives a cURL/XML request to display text alerting a security center that a Silent 911 distress has been activated according to an embodiment herein.

In step 520, the second communication device 228 (e.g., an Emergency Services VoIP phone), may also receive a cURL/XML request 332 to display a message alerting a security center, such as a Base Defense Operations Center (BDOC), through the second communication device 228 that a Silent 911 distress has been activated, as illustrated schematically in FIG. 10.

Figure 11:
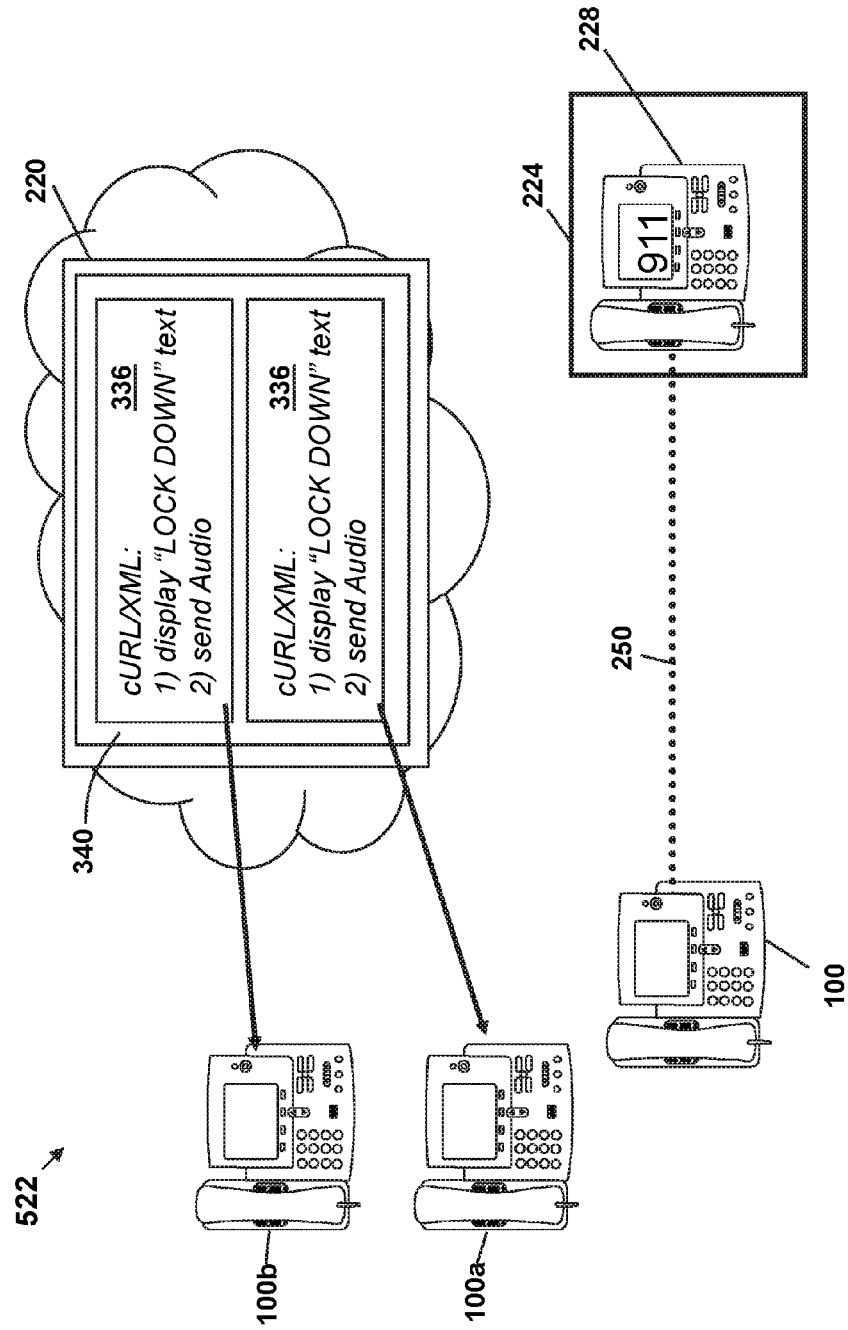
FIG. 11 is a schematic diagram illustrating a step of sending cURL/XML requests to other client side communication devices in the network to display text notifying users of an active shooter in the vicinity and to send audio files of a pre-determined length to an Audio Processing Interface (API) software according to an embodiment herein.

FIG. 11 is a schematic diagram illustrating step 522 of sending the cURL/XML requests 336 to other client side first communication devices 100a and 100b in the network 214 to display text 108 notifying users of an active shooter in the vicinity and to send audio files of a pre-determined length to an Audio Processing Interface (API) software module 340.

Figure 12:
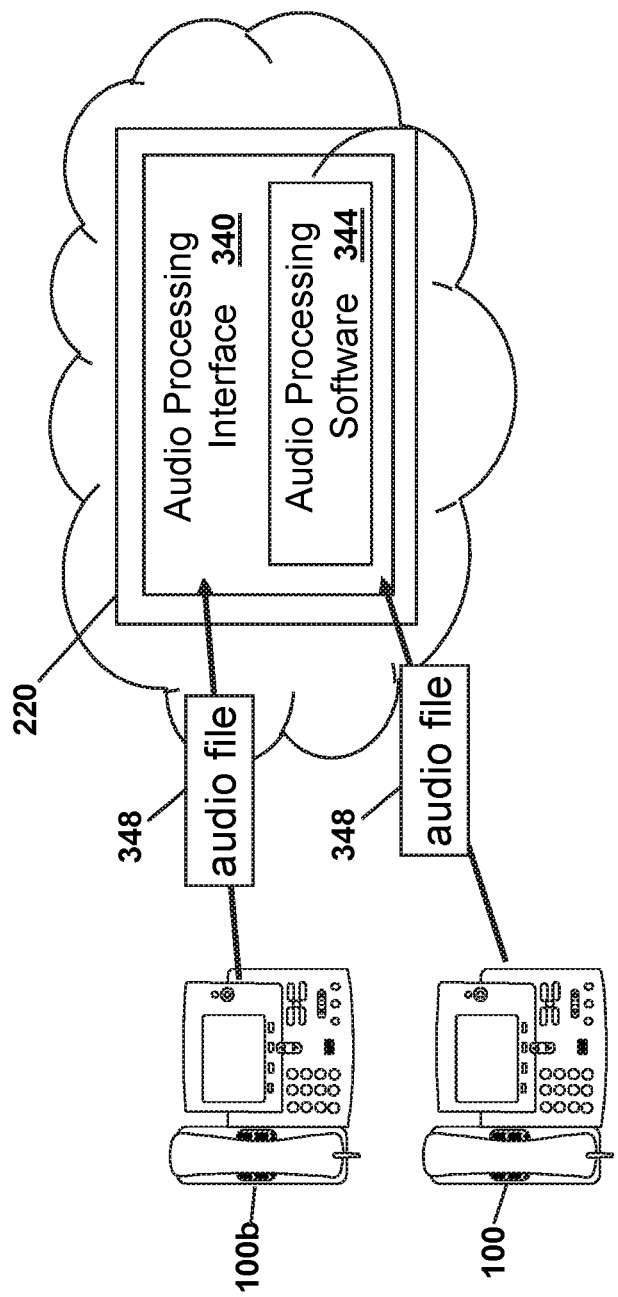
FIG. 12 is a schematic diagram illustrating a step where the Audio Processing Interface software takes audio files from client side communication devices and uses an Audio Processing Software, such as open source OREKA, to calculate the average decibel (dB) level in the given audio clip according to an embodiment herein.

FIG. 12 is a schematic diagram illustrating step 524 where the API software module 340 may take audio files 348 from client side communication devices 100, 100a, and 100b and use an Audio Processing Software module 344, such as open source OREKA, for example, to calculate the average decibel (dB) level in the given audio clip. The Audio Processing Software module 344 may calculate the average decibel or RMS of a sound which may then be used by the system 200 in a number of different ways. For example, as described above, the sound level may be compared to volume levels stored in a database 354 (see FIG. 13), such that the database 354 may be utilized to visualize sound throughout a building 405, the sound level (i.e., volume/decibel reading) may be used to provide a displayed map 400 to a first responder, and the database 354 may be used to trigger alerts when sounds greater than a threshold are received or when loud sounds are received from multiple locations. In an embodiment, the Audio Processing Software module 344 is distinct from the mapping module 244, but may work together with the mapping module 244 to provide the useful sound information on the map 400.

Figure 13:
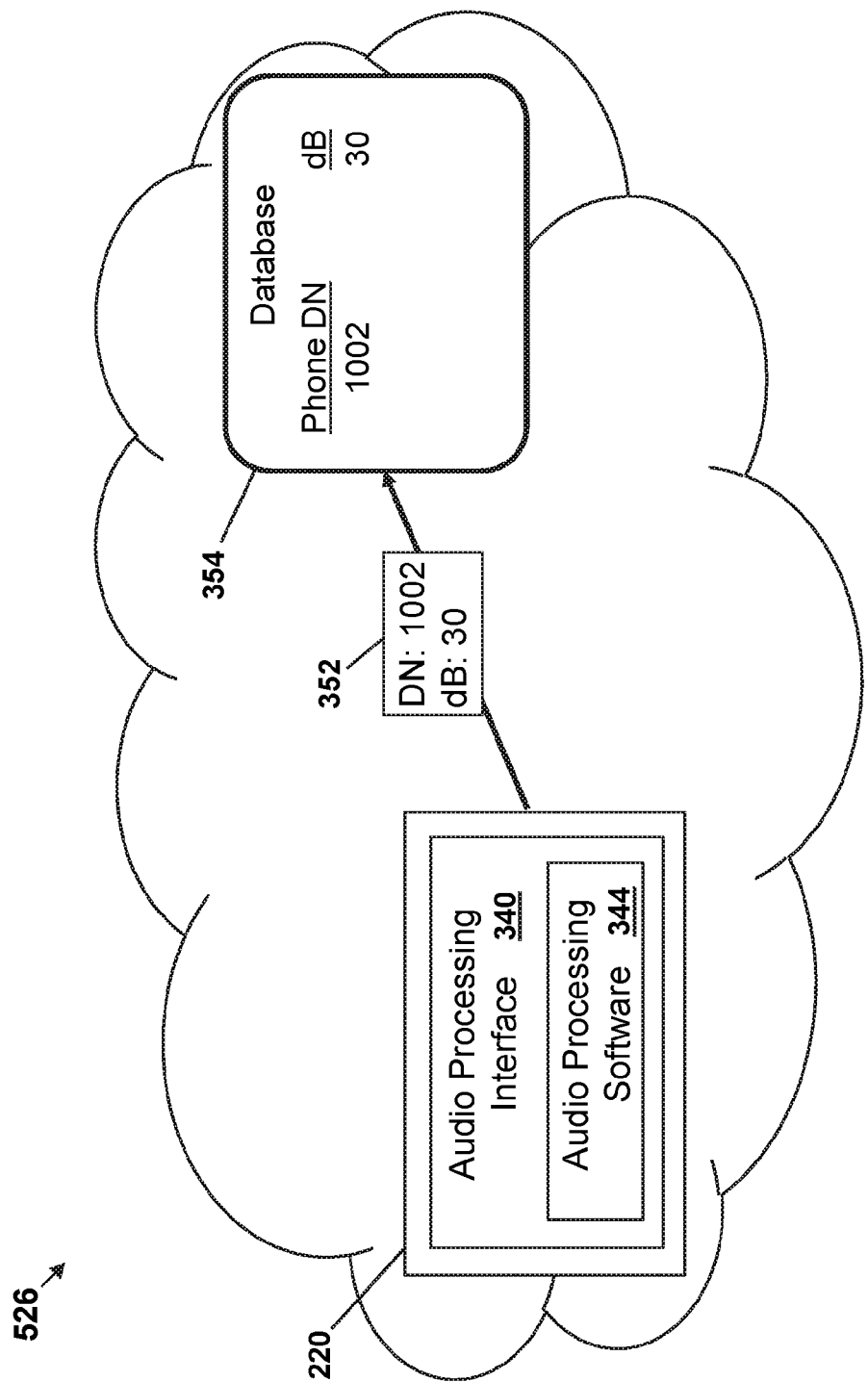
FIG. 13 is a schematic diagram illustrating a step where the value for the average decibel level is stored in a Data Base (DB) with decibel values corresponding to communication device identifying values such as IP number or DN number according to an embodiment herein.

In step 526, the value for the average decibel level 352 may be stored in a database 354 with decibel values corresponding to first communication device 100 identifying values such as the IP number or DN number as shown in FIG. 13.

Figure 14:
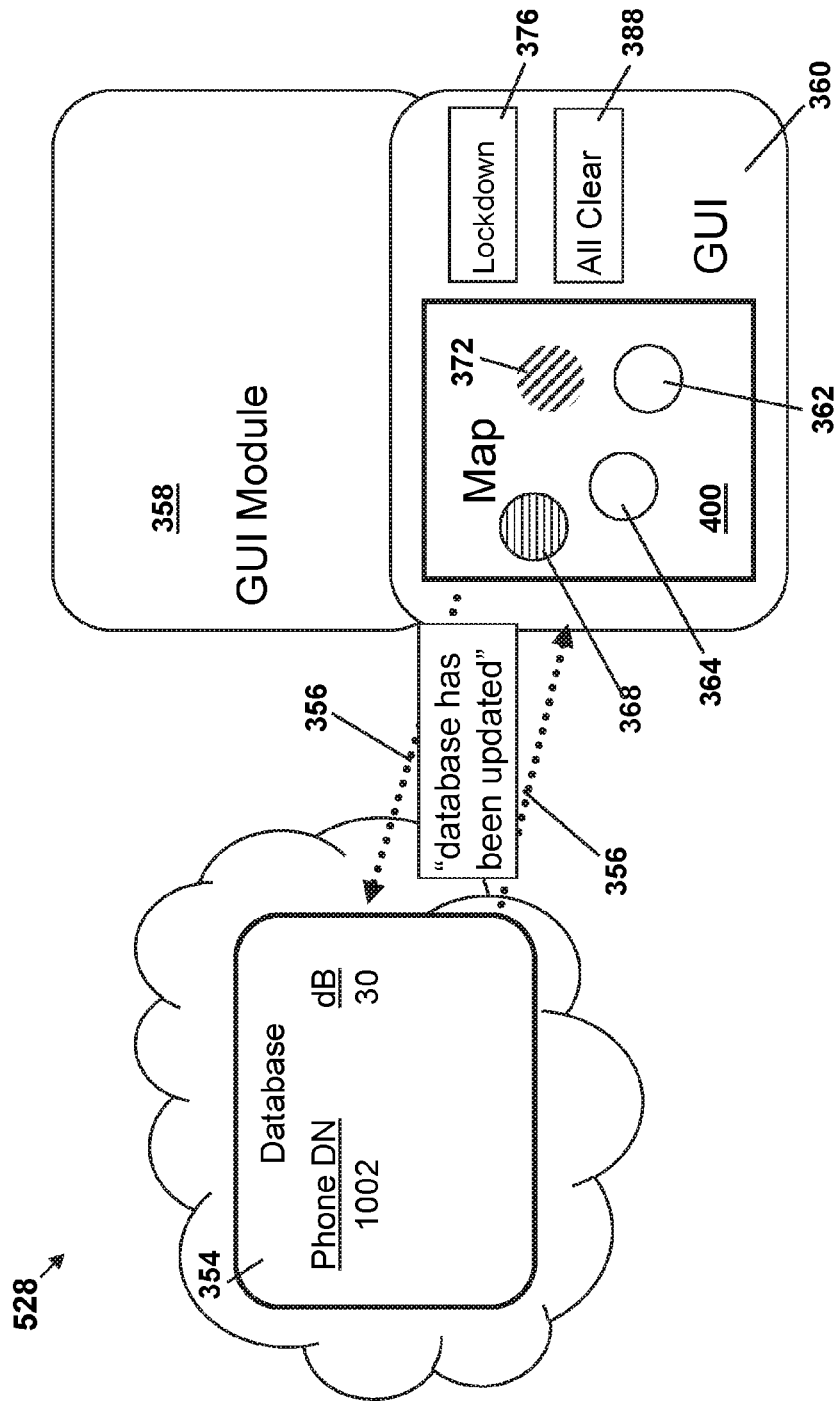
FIG. 14 is a schematic diagram illustrating a step where, as part of the Graphical User Interface (GUI) module, changes in the database trigger the GUI to show a map of the location of client side communication devices with individual locations marked by color coded indicators in which the colors correspond to the dB level, such as grey for quiet (i.e., low dB value), green for medium (e.g., office conversation levels having medium dB value), yellow for loud (e.g., screaming or shouting having a medium to high dB value), and up to red for loud (e.g., such as a gunshot report having a high dB value) according to an embodiment herein.

In step 528, as illustrated schematically in FIG. 14, the Graphical User Interface (GUI) module 358 may detect entry changes 356 in the database 354 and trigger the GUI 360 to show the map 400 when there are changes 356 in the database 354. The map 400 may display the location of first communication devices 100, 100a, 100b with locations marked by color coded indicators in which the colors correspond to the dB level as indicated above with reference to FIG. 4. For example, grey 362 may indicate quiet, low dB value, green 364 may indicate medium dB values, such as office conversation levels, yellow 368 may indicate medium high dB values, such as loud, screaming or shouting, and red 372 may indicate high dB values such as loud, gunshot report. The Lockdown button 376 and All Clear button 388 are described below in conjunction with FIGS. 15 and 16.

Figure 15:
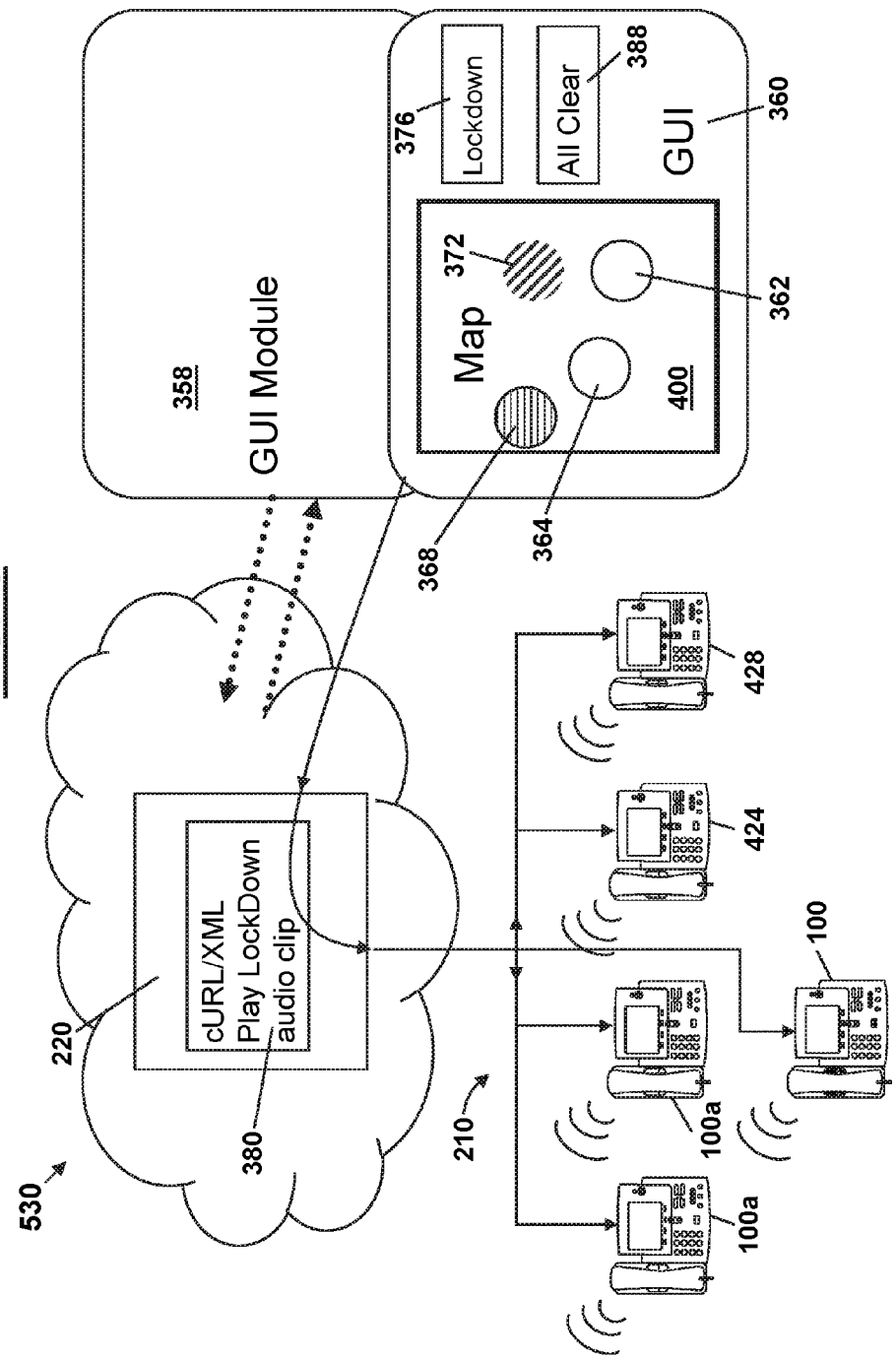
FIG. 15 is a schematic diagram illustrating clicking on a Lockdown button on the GUI sends a cURL/XML request to all communication devices in the network to play an audio clip stating "Lock down" procedures according to an embodiment herein.

Step 530 is shown in FIG. 15 where clicking on the Lockdown button 376 on the GUI 360 may send a cURL/XML request 380 to all communication devices 100, 100a, 100b, 424, 428 in the network 210 to play a warning audio clip, such as an audio clip stating "Lock down" procedures according to an embodiment herein. A user 160 may click the Lockdown button 376 or the cURL/XML request 380 may be sent automatically to all communication devices 100, 100a, 100b, 424, 428 in the network 210 to play the warning audio clip.

Figure 16:
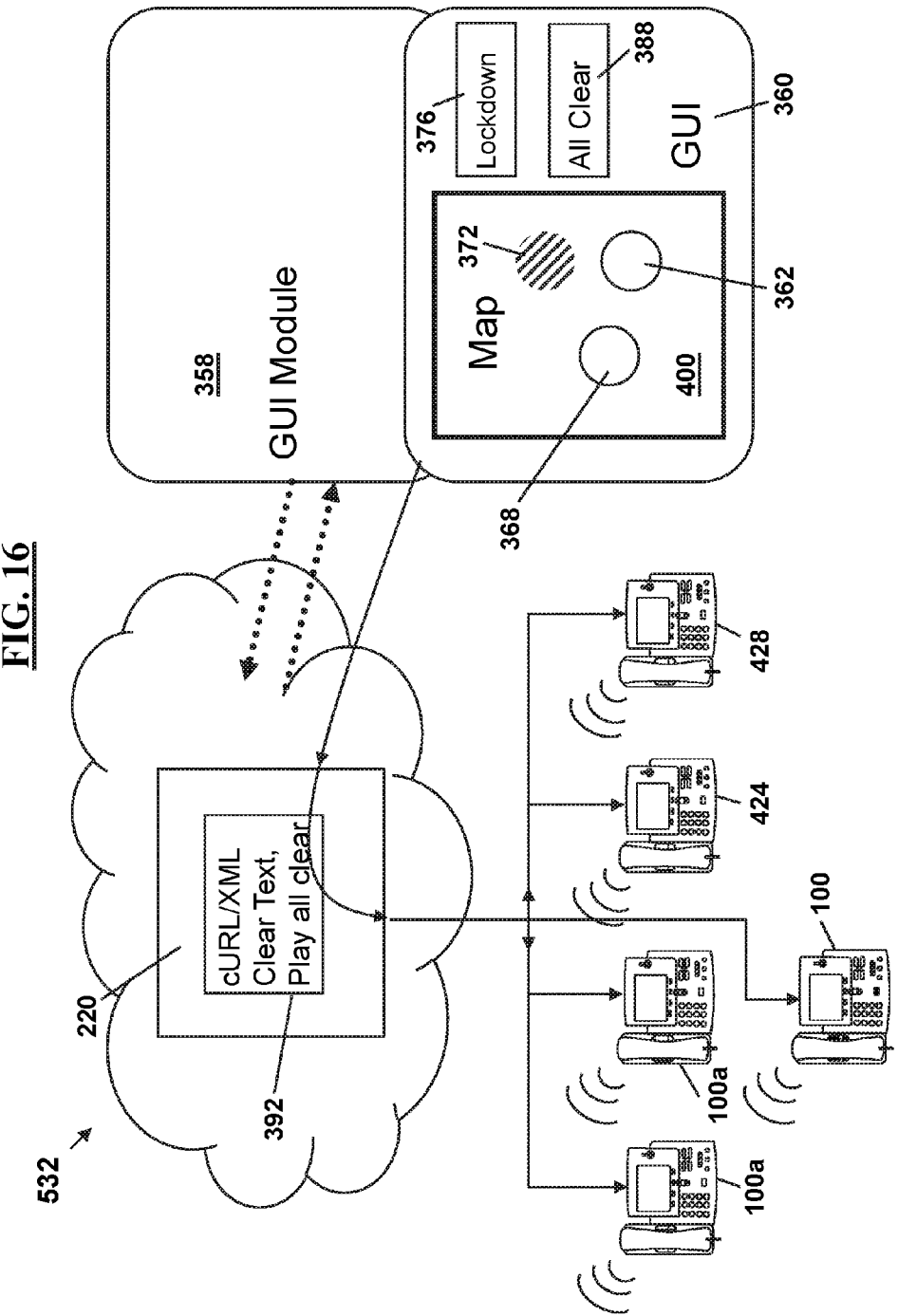
FIG. 16 is a schematic diagram illustrating clicking on the All Clear button on the GUI sends a cURL/XML request to all communication devices in the network to play an audio clip stating "All clear" and to remove any text messages displayed according to an embodiment herein.

FIG. 16 is a schematic diagram illustrating step 532 where clicking on the "All Clear" button 388 on the GUI 360 sends a cURL/XML request 392 to all phones 100, 100a, and 100b in the network 210 to play an audio clip stating "All clear" and to remove any text messages 108 displayed according to an embodiment herein. For example, upon determining a false alarm or conclusion of an incident, a user may click the "All Clear" button 388 on the GUI 360.

Figure 17:
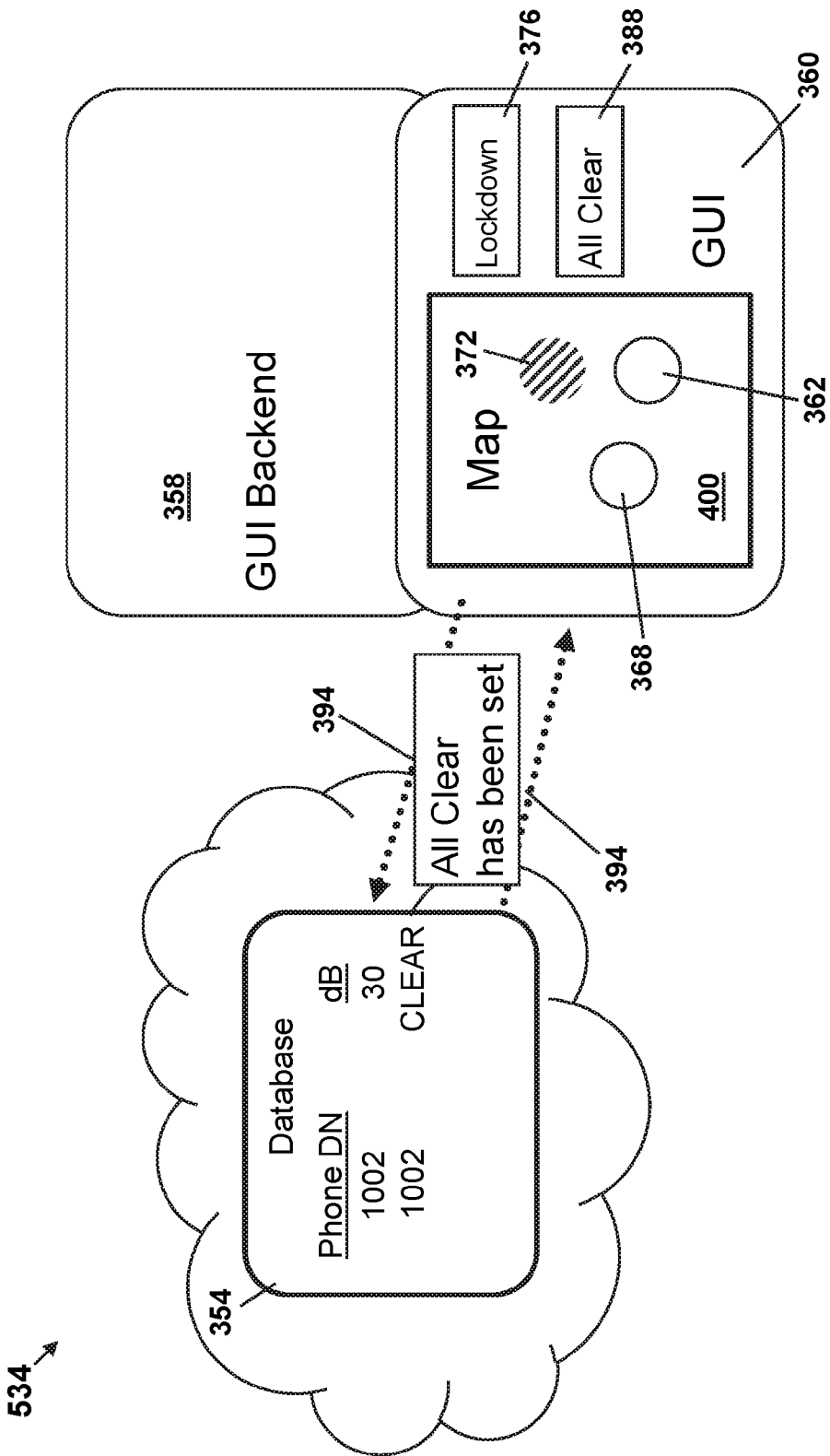
FIG. 17 is a schematic diagram illustrating a step where the GUI also updates the database to show that an "All clear" message has been sent according to an embodiment herein.

FIG. 17 is a schematic diagram illustrating step 534 where the GUI module 358 may also create update entries 394 in the database 354 to show that an "All Clear" indication has been set according to an embodiment herein.

In an exemplary embodiment, the various modules described herein and illustrated in the figures are embodied as hardware-enabled modules and may be configured as a plurality of overlapping or independent electronic circuits, devices, and discrete elements packaged onto a circuit board to provide data and signal processing functionality within a computer. An example might be a comparator, inverter, or flip-flop, which could include a plurality of transistors and other supporting devices and circuit elements. The modules that are configured with electronic circuits process computer logic instructions that provide digital and/or analog signals for performing various functions as described herein. The various functions may further be embodied and physically saved as any of data structures, data paths, data objects, data object models, object files, and database components. For example, the data objects may be configured as a digital packet of structured data. The data structures may be configured as any of an array, tuple, map, union, variant, set, graph, tree, node, and an object, which may be stored and retrieved by computer memory and may be managed by processors, compilers, and other computer hardware components. The data paths may be configured as part of a computer CPU that performs operations and calculations as instructed by the computer logic instructions. The data paths could include digital electronic circuits, multipliers, registers, and buses capable of performing data processing operations and arithmetic operations (e.g., Add, Subtract, etc.), bitwise logical operations (AND, OR, XOR, etc.), bit shift operations (e.g., arithmetic, logical, rotate, etc.), complex operations (e.g., using single clock calculations, sequential calculations, iterative calculations, etc.). The data objects may be configured as physical locations in computer memory and may be a variable, a data structure, or a function. In the embodiments configured as relational databases (e.g., such Oracle® relational databases), the data objects may be configured as a table or column. Other configurations include specialized objects, distributed objects, object oriented programming objects, and semantic web objects, for example. The data object models may be configured as an application programming interface for creating HyperText Markup Language (HTML) and Extensible Markup Language (XML) electronic documents. The models may be further configured as any of a tree, graph, container, list, map, queue, set, stack, and variations thereof. The data object files are created by compilers and assemblers and contain generated binary code and data for a source file. The database components nay include any of tables, indexes, views, stored procedures, and triggers.

The embodiments herein may comprise a computer program product configured to include a pre-configured set of instructions, which when performed, may result in actions as stated in conjunction with the methods described above. In an example, the pre-configured set of instructions may be stored on a tangible non-transitory computer readable medium or a program storage device. In an example, the tangible non-transitory computer readable medium may be configured to include the set of instructions, which when performed by a device, may cause the device to perform acts similar to the ones described here. Embodiments herein may also include tangible and/or non-transitory computer-readable storage media for carrying or having computer executable instructions or data structures stored thereon.

Generally, program modules include routines, programs, components, data structures, objects, and the functions inherent in the design of special-purpose processors, etc. that perform particular tasks or implement particular abstract data types. Computer executable instructions, associated data structures, and program modules represent examples of the program code means for executing steps of the methods disclosed herein. The particular sequence of such executable instructions or associated data structures represents examples of corresponding acts for implementing the functions described in such steps. The embodiments herein may include both hardware and software elements. The embodiments that are implemented in software include but are not limited to, firmware, resident software, microcode, etc.

The techniques provided by the software-enabled embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chip may be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product may be any product that includes integrated circuit chips, ranging from toys and other low-end applications to advanced computer products having a display, a keyboard or other input device, and a central processor.

A data processing system suitable for storing and/or executing program code will include at least one processor coupled directly or indirectly to memory elements through a system bus. The memory elements may include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) may be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 18:
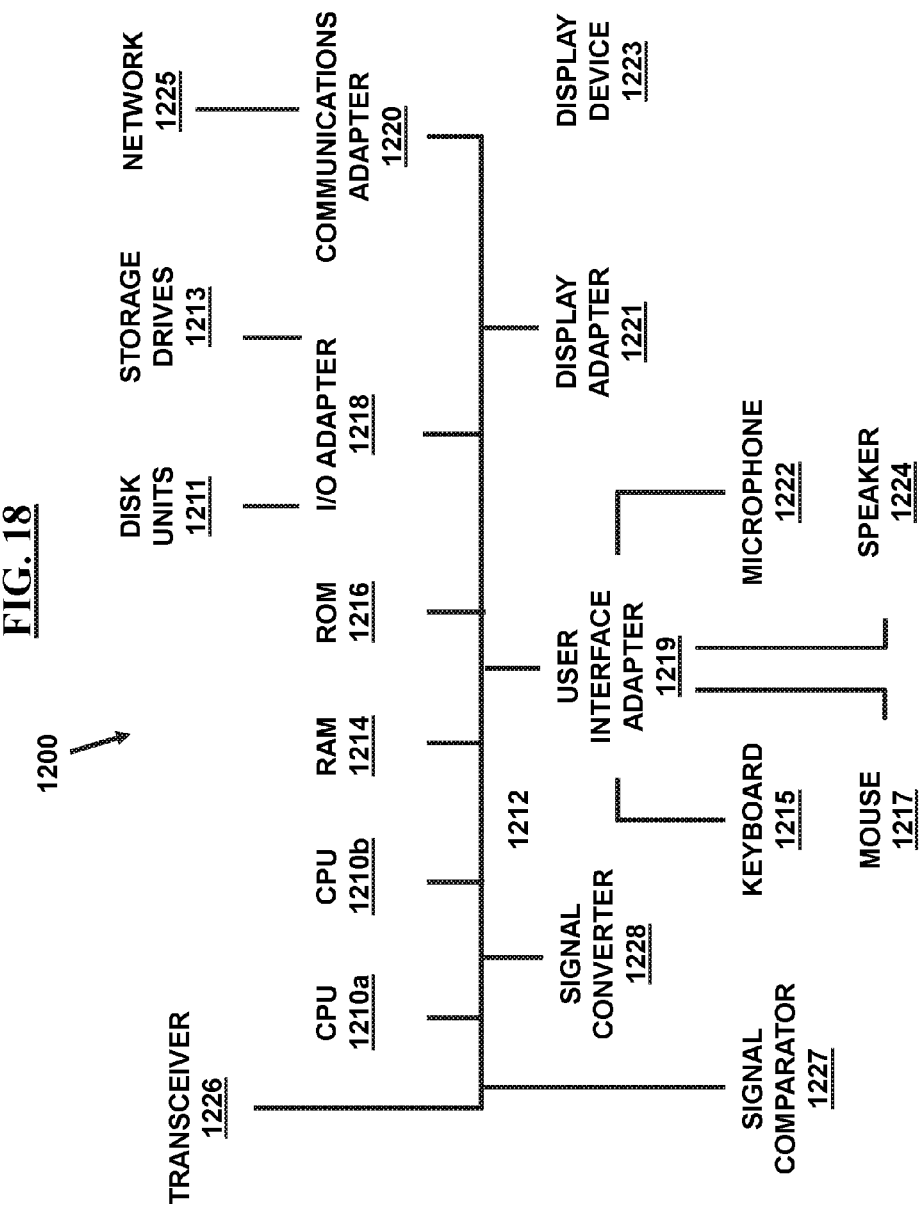
FIG. 18 is a schematic diagram of a representative computer architecture used in accordance with the embodiments herein.

A representative hardware environment for practicing the embodiments herein is depicted in FIG. 18, with reference to FIGS. 1 through 17. This schematic drawing illustrates a hardware configuration of an information handling/computer system 1200 in accordance with an exemplary embodiment herein. The system 1200 comprises at least one processor or central controller (CPU) 1210*a*, 1210*b*. The CPUs 1210*a*, 1210*b* are interconnected via system bus 1212 to various devices such as a random access memory (RAM) 1214, read-only memory (ROM) 1216, and an input/output (I/O) adapter 1218. The I/O adapter 1218 may connect to peripheral devices, such as disk units 1211 and storage drives 1213, or other program storage devices that are readable by the system. The system 1200 may read the inventive instructions on the program storage devices and follow these instructions to execute the methodology of the embodiments herein. The system 1200 further includes a user interface adapter 1219 that connects a keyboard 1215, mouse 1217, speaker 1224, microphone 1222, and/or other user interface devices such as a touch screen device (not shown) to the bus 1212 to gather user input. Additionally, a communication adapter 1220 connects the bus 1212 to a data processing network 1225, and a display adapter 1221 connects the bus 1212 to a display device 1223, which provides a GUI (e.g., GUI 360) in accordance with the embodiments herein, or which may be embodied as an output device such as a monitor, printer, or transmitter, for example. Further, a transceiver 1226, a signal comparator 1227, and a signal converter 1228 may be connected with the bus 1212 for processing, transmission, receipt, comparison, and conversion of electric or electronic signals.

The system 200 provided by the embodiments herein may include utilizing internet protocol (IP) networking which appears to be increasingly a standard for communicating across many organizations both public and private. The system 200 may provide early detection of emergency events as well as real-time monitoring of such events. The system 200 may provide law enforcement and early responders with situational awareness of evolving threats, for example, active shooter events. The system 200 may include IP networked duress buttons 102 that may be built into speed dial phones that, and when pressed, may send live audio of an emergency to the authorities.

The system 200 may also include providing a color-coded map 400 that may provide the general location 404 of a threat based on distress signals or sound activity transmitted via IP connected devices, such as VoIP phones or IP phones, for example, CISCO BUSINESS SERVER 6000® IP PHONE (available from Cisco, Inc.), in a building 405, etc. The color dynamics of the map 400 may change with the intensity of sound energy that is detected by the communication devices 100, 100a, 100b, 424, 428. For example, red may indicate the highest intensity of sound, such as gunfire, mid-intensity may be represented by yellow and be associated with the level of normal human speech, and grey may denote minimal energy, reflecting a quiet room. With the heat-up GUI map information, authorities may be able to validate a threat, identify the threat location, clear the uncertainties of a threat situation in real-time, and provide more immediate direction to first responders. Additionally, a message, such as a warning to lockdown, that may include both audible and visual components, such as text display, may be broadcasted throughout the network 210 through the devices 100, 100a, 100b, 424, 428. By decreasing the time early responders spend identifying and responding to a threat, the system 200 may save the lives of occupants in the vicinity of the active threat. The techniques provided by the embodiments herein may be implemented in any type of building 405, for example, but not limited to, offices, hospitals, colleges, military bases, institutions, shopping centers, and schools. The embodiments herein may also provide for cost savings by using almost no additional installation of hardware necessary beyond the integration of existing hardware, such as an already resident and active VoIP phone system.

The foregoing description of the specific embodiments will so fully reveal the general nature of the embodiments herein that others may, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Those skilled in the art will recognize that the embodiments herein may be practiced with modification within the spirit and scope of the appended claims.

What is claimed is:

1. A method of assessing a threat level associated with a distress signal, said method comprising:
    linking a client side communication system with a provider side communication system over a communications network, wherein said client side communication system comprises a first communication device, and wherein said provider side communication system comprises a second communication device;
    linking said first communication device with said second communication device over said communications network;
    transmitting a distress signal from said first communication device to said second communication device;
    mapping, via said provider side communication system, a geographic origin of said distress signal;
    transmitting an audio signal in a one-way communication link from said first communication device to said second communication device;
    utilizing, via said second communication device, said audio signals collected from said first communication device to identify a location of a threat in relation to the geographic origin of said distress signal; and
    attributing a threat level associated with any of an audio level, a frequency, and a duration of the transmitted audio signal via said provider side communication system, wherein the attributing of said threat level comprises dynamically representing a seriousness of a threat on a map.

2. The method of claim 1, further comprising said provider side communication system communicating with an emergency responder system and transmitting said geographic origin of said distress signal.

3. The method of claim 1, wherein said client side communication system further comprises a plurality of first communication devices,
    wherein said provider side communication system transmits a warning message to said plurality of first communication devices, and
    wherein said plurality of first communication devices comprise speakers and play an audio of said warning message over said speakers.

4. The method of claim 1, wherein said client side communication system further comprises a plurality of first communication devices,
    wherein said provider side communication system transmits an all clear message to said plurality of first communication devices, and
    wherein said plurality of first communication devices comprise speakers and play an audio of said all clear message over said speakers.

5. A non-transitory program storage device readable by computer, and comprising a program of instructions executable by said computer to perform a method of assessing a threat level associated with a distress signal, said method comprising:

linking a client side communication system with a provider side communication system over a communications network, wherein said client side communication system comprises a first communication device, and wherein said provider side communication system comprises a second communication device;

linking said first communication device with said second communication device over said communications network;

transmitting a distress signal from said first communication device to said second communication device;

mapping, via said provider side communication system, a geographic origin of said distress signal;

transmitting an audio signal in a one-way communication link from said first communication device to said second communication device;

utilizing, via said second communication device, said audio signal collected from said first communication device to identify a location of a threat in relation to the geographic origin of said distress signal;

assessing, via said provider side communication system, a severity level of said distress signal; and attributing a threat level associated with any of an audio level, a frequency, and a duration of the transmitted audio signal via said provider side communication system, wherein the attributing of said threat level comprises dynamically representing a seriousness of a threat on a map.

6. The program storage device of claim 5, wherein said method further comprises configuring said provider side communication system to communicate with an emergency responder system and transmitting said geographic origin of said distress signal to the emergency responder system.

7. The program storage device of claim 5, wherein said client side communication system further comprises a plurality of first communication devices, and the method further comprises:

transmitting, via said provider side communication system, a warning message to said plurality of first communication devices, and wherein said plurality of first communication devices comprise speakers, and the method further comprises playing an audio of said warning message over said speakers.

8. A system for assessing a threat level associated with a distress signal, said system comprising:

a client side communication system communicatively linked with a provider side communication system over a communications network, wherein said client side communication system comprises a first communication device, wherein said provider side communication system comprises a second communication device, and wherein said first communication device is communicatively linked with said second communication device over said communications network;

a transceiver operatively connected to said first communication device and configured to transmit a distress signal from said first communication device to said second communication device;

a processor operatively connected to said provider side communication system, and configured to conduct a threat assessment associated with said distress signal;

a mapping module operatively connected to said provider side communication system, and configured to map a geographic origin of said distress signal;

a display device operatively connected to said processor and configured to graphically represent a seriousness of a threat based on said threat assessment; and a microphone operatively connected to said first communication device, and configured to transmit an audio signal in a one-way communication link from said first communication device to said second communication device, wherein said processor is configured to attribute a threat level associated with any of an audio level, a frequency, and duration of the transmitted audio signal, wherein said processor is configured to assess a severity level of said distress signal, wherein said second communication device is configured to utilize said audio signal received from said first communication device to identify a location of a threat and to dynamically represent a seriousness of a threat on a map.

9. The system of claim 8, wherein said provider side communication system is configured to communicate with an emergency responder system and transmit said geographic origin of said distress signal to said emergency responder system.

10. The system of claim 8, wherein said client side communication system further comprises a plurality of first communication devices, wherein said provider side communication system is configured to transmit a warning message to said plurality of first communication devices, and wherein said plurality of first communication devices comprise speakers and are configured to play an audio of said warning message over said speakers.

11. The system of claim 8, wherein said first communication devices comprises a telephone.

12. The system of claim 8, further comprising a button on said first communication device operatively connected to said transceiver, wherein said button is configured to generate and send said distress signal to said transceiver for transmission to said second communication device.

* * * * *